United States Patent [19]

Howard et al.

[11] 3,954,190

[45] May 4, 1976

[54] PALLETIZER

[75] Inventors: Richard W. Howard, Forest Lake Township, Washington County; Roman J. Weier; Ronald E. Wyman, both of North St. Paul, all of Minn.

[73] Assignee: Wyard Industries, Inc., Forest Lake, Minn.

[22] Filed: May 6, 1974

[21] Appl. No.: 467,371

[52] U.S. Cl............................ 214/6 P; 198/31 AA; 198/235; 198/283; 214/6 DK
[51] Int. Cl.².................................. B65G 57/24
[58] Field of Search.................. 214/6 P, 6 DK, 6 H, 214/6 M, 8.5 F; 198/31 AA, 31 AB, 31 AC, 235, 282, 283

[56] References Cited
UNITED STATES PATENTS

| | | | |
|---|---|---|---|
| 2,709,513 | 5/1955 | Weber et al. | 198/31 AA |
| 3,050,199 | 8/1962 | McGrath et al. | 214/6 P |
| 3,056,513 | 10/1962 | Von Gal, Jr. | 214/6 H |
| 3,402,830 | 9/1968 | Copping et al. | 214/6 P |
| 3,520,422 | 7/1970 | Bruce et al. | 214/6 DK |
| 3,521,736 | 7/1970 | Von Gal et al. | 214/6 P X |
| 3,523,618 | 8/1970 | Nielsen | 198/32 X |
| 3,587,876 | 6/1971 | Dahlem et al. | 214/6 P |
| 3,670,906 | 6/1972 | Miller et al. | 214/6 P |
| 3,834,516 | 9/1974 | Reeser | 198/283 |
| 3,854,601 | 12/1974 | Miller et al. | 214/6 P |

*Primary Examiner*—Albert J. Makay
*Assistant Examiner*—L. J. Paperner
*Attorney, Agent, or Firm*—John C. Barnes

[57] ABSTRACT

An improved apparatus for the loading of pallets with tiers of cartons. The apparatus of the present invention utilizes three star wheels, one to divide a feed line or single file of cartons into two rows and a pair of star wheels rotatable about axes normal to the path of the cartons in the two rows for varying the position of cartons on conveyors forming the tiers. The tiers, after being formed, are stacked on a pallet. The pallets are supported on an elevator to be lowered from the tier-forming station. New pallets are introduced at the tier-forming station while a loaded pallet is being discharged from the palletizing machine. The machine which forms the tiers is in an elevated position and each tier is formed in the tier-forming station by cartons fed from each side of the tier. The tier-forming station is at one end of the machine and an elevator lowers the pallet as it is loaded with successive tiers which provides a machine capable of substantially increasing the rate at which cartons capable of substantially increasing the rate at which cartons can be handled. The tiers, as they are formed, are pushed from a stationary plate onto a moving plate which carries the cartons of the tier over the pallet and the movable plate is then retracted from beneath the tier placing it on the pallet or previously deposited tier.

13 Claims, 13 Drawing Figures

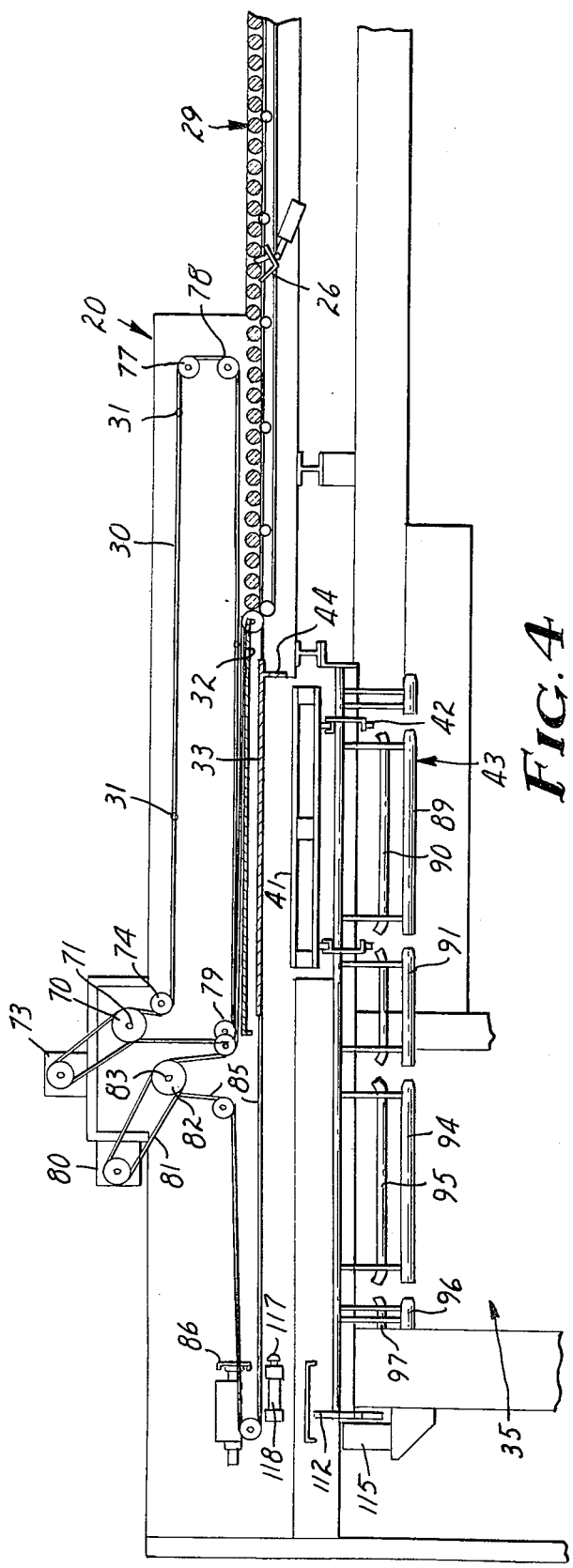
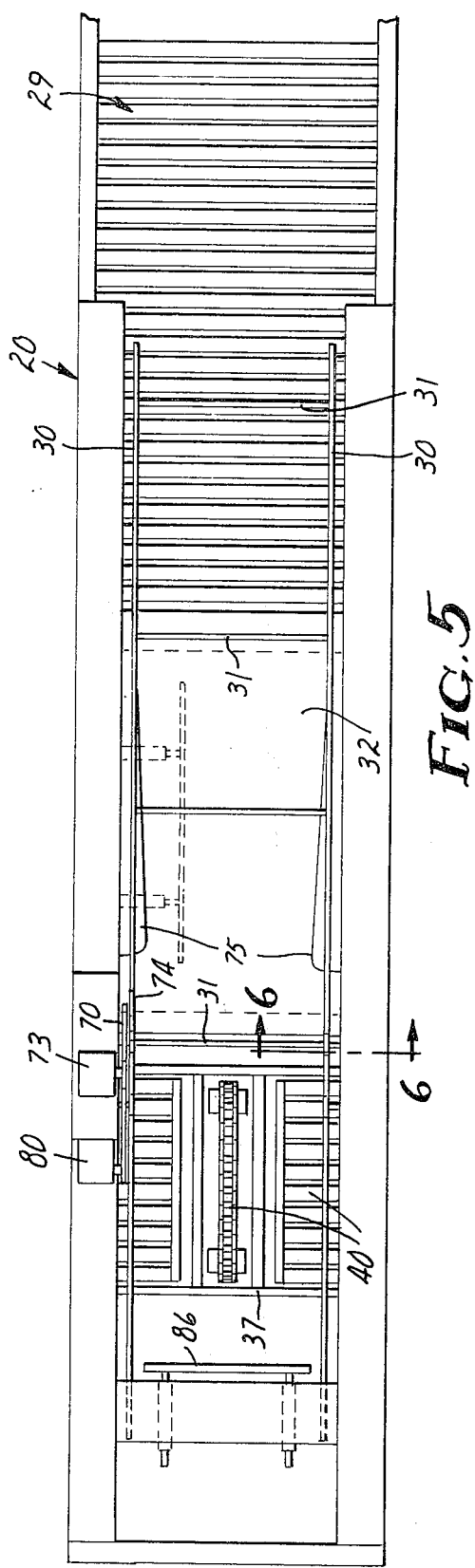
FIG. 4
FIG. 5

| ELAPSED TIME - SECONDS | 10 | 20 | 30 |

| Task | Duration |
|---|---|
| HOIST DROP | ½ |
| PLATE FORWARD 200 FPM | 1 |
| PLATE RETRACT 200 FPM | 1 |
|  | ½ |
| REPEAT ABOVE × 9 | 21 |
|  | 1 |
| FINAL HOIST DROP | 1 |
| RAISE PALLET TRACK | 1 |
| PLATE FORWARD & PALLET INSERT | 1 |
| PLATE RETRACT | 1 |
| HOIST DROP | ½ |
| PLATE FORWARD 120 FPM | 1 |
| PLATE RETRACT 120 FPM | 1 |
| RAISE HOIST | 1½ |
| DROP PALLET TRACK | 2 |

FIG. 13

PALLETIZER

BACKGROUND OF THE INVENTION

1. Field of the Invention

This invention relates to an improvement in machines for forming tiers of cartons in a predetermined pattern and loading or stacking successive tiers on a pallet to be transported from the machine. In one aspect this invention relates to an improved machine wherein the tiers are formed continuously and placed on the pallet or preceding tiers and when a pallet is loaded it is moved out of the elevator but an empty pallet is mechanically inserted into the stream of tiers at the top of the elevator between a loaded pallet and the tier-forming stationary plate.

2. Description of the Prior Art

The prior art is replete with devices for placing cartons upon pallets to load the pallets automatically. In many of the known prior art patents it is necessary to utilize elevator means for lifting successive tiers of cartons onto a pallet to produce a stack of cartons on said pallet. It has been found however to be advantageous to form the tiers of cartons and to move the same along the continued path to a position above the supporting pallet and then to lower the cartons onto the pallet and onto preceding tiers to stack a pallet with several tiers of cartons. The pallet is lowered after each tier is placed thereon to a position to receive a subsequent tier. After the pallet is completely loaded the same is moved out of the elevator and a second pallet is inserted to receive the next tier of cartons. If it is necessary to wait for the loaded pallet to be removed from the elevator and for the elevator to receive a pallet and raise the pallet to a loading position the continued stream of cartons to the accumulator forming the tiers is interrupted. It is thus advantageous to insert the empty pallets at the top of the elevator receiving the tiers.

One prior patent, U.S. Pat. No. 2,815,870, issued Dec. 10, 1957 to Herman Laub discloses an apparatus wherein the pallets are placed at the upper portion of the stacking column to receive cases placed thereon avoiding the necessity of the pallet being placed on the elevator and elevated to receive the first layer. The machine construction disclosed in U.S. Pat. No. 2,815,870, however has the tier forming machanism positioned directly over the elevator making it necessary for the flow of cartons to be interrupted as each row is formed and after each tier is formed. Further, the elevator structure utilized flight bars extending between endless chains such that each elevator comprised a pair of spaced flight bars which would be bridged by a pallet. In this construction the pallets have to be in nearly excellent condition without splintered edges or corners such that they could be supported only at opposite edges and carry the full load or stack placed thereon. The disadvantages of the prior art devices are thus the necessary interruption of carton flow and the lack of complete support beneath the pallet as the height of the stack increases. The first slows the production rate and the second means that many pallets become rejects for fear they will not be adequate supports in the loading elevator.

It is an object of the present invention to provide a "palletizer" or a pallet loading machine which will form tiers of cartons and stack the same on the pallet without interrupting the flow of cartons from a packaging, boxing or casing machine. The pallet loading machine of the present invention provides a novel pallet inserting machanism which supports the pallet in two loading positions prior to the same being placed upon the elevator such that continued movement of cases and tiers of cases is not interrupted. The tiers are stacked by being wiped off a stationary plate onto a moving plate which is then stripped from beneath the cartons placing them in the stack.

SUMMARY OF THE INVENTION

The pallet loading device of the present invention comprises an in-feed conveyor which feeds cartons to a powered roller conveyor which transfers the cartons to a primary rotator or star wheel. The primary rotator is provided to receive two cartons and position all of the cartons in a predetermined position for movement into the tier-forming machine. The tier-forming machine receives the cartons in two parallel paths, each path leading to a secondary rotator which may be raised out of the path or which may engage and turn one or two cartons at a time to place the cartons in a correct orientation to form the required pattern of cartons in a tier. The secondary rotators are programmed and operate independently to rotate the cartons and if it is desired not to rotate the cartons the secondary rotators are moved vertically out of the path of the cartons. From the secondary rotators the cartons enter the tier-forming area. The tier-forming area consists of powered rollers to move the cartons, endless belts which converge to crowd the cartons, and a number of air operated stops which are properly located between the powered rollers of the roller conveyor to assist in forming the desired pattern for each tier of cartons. From the tier-forming area the completed tiers of cartons are conveyed into the loading area.

In the loading area the completed tiers are pushed by successive flight or push bars extending between endless chains from the powered roller conveyor onto a fixed transfer plate. Each push bar continues to move the tier off the fixed transfer plate depositing the cartons onto a movable stripping plate, moving with the push bar. The stripping plate receives the tier when it is positioned above the pallet and the stripper plate is then retracted to a position beneath the fixed plate and the push bar holds the cartons so the stripper plate will be stripped from beneath the cartons placing them on the pallet. Upon the return of the stripper plate the pallet is lowered with the tier of cartons. The stripper plate is then beneath the transfer plate and another tier of cartons is wiped from the fixed transfer plate onto the moving stripper plate and the second tier is moved out over the elevator. When the pallet is completely loaded it is lowered to the discharge conveyor by the elevator and it is moved out of the stacking chamber. As the pallet is moved out of the stacking chamber an empty pallet is injected into the top of the stacking chamber on a pair of guide rails during the reciprocatory movement of the stripping plate into the area above the elevator with the next tier. The empty pallet is supported by the guide rails and the guide rails can be lowered to receive at least a second tier of cartons allowing sufficient time for the elevator to return to support the pallet across its entire area and to continue lowering the pallet fixed amounts in the stacking chamber as the entire stack is completed to form a load.

The palletizing device constructed in accordance with the present invention thus comprises the tier-forming member and a loading station including fixed transfer plate loading means, reciprocating stripping plate means, and an elevator movable vertically in a stacking chamber. Conveyor means are provided for injecting empty pallets beneath the fixed transfer plate means and the stripping plate means. Guide rail means are provided for raising the empty pallet to a position to be moved by the transfer plate along the rails into the stacking chamber upon the periodic completion of the forming of a stack. Guide means are supported to hold the pallet to receive the tier of cartons on the stripping plate and to lower the tier to receive a second layer to allow the elevator to lower a loaded pallet, let the loaded pallet be carried out by the discharge conveyor and return to support the inserted pallet. The guide means and support means for the pallet thus provide an accumulator for tiers of cartons while the stacking chamber is being cleared of a loading pallet.

BRIEF DESCRIPTION OF THE DRAWING

An illustrative embodiment of the present invention is described herein and shown in the accompanying drawing wherein:

FIG. 4 is a fragmentary longitudinal sectional view of the loading station and the top portion of the stacking chamber;

FIG. 5 is a plan view of the loading section of the machine shown in FIG. 4;

FIG. 13 is a graph of a timing chart indicating the timing sequence of the operations of the loading station.

DETAILED DESCRIPTION OF THE PREFERRED EMBODIMENT

The pallet loading machine of the present invention is adapted to be positioned at the end of a bottling, canning or packaging machine which places articles in cartons, which cartons are to be stacked on pallets for ready shipment. The production requirement of the packaging machines has increased to an extent that it is necessary to very rapidly handle these cartons and place the cartons in tiers. A machine which will handle at least 100 cartons per minute and stack the cartons in a seven carton tier with twelve tiers per pallet provides equipment which will meet the present packaging requirements. This is believed to be 15 to 20 cartons a minute faster than existing machines for palletizing.

Figure 1:
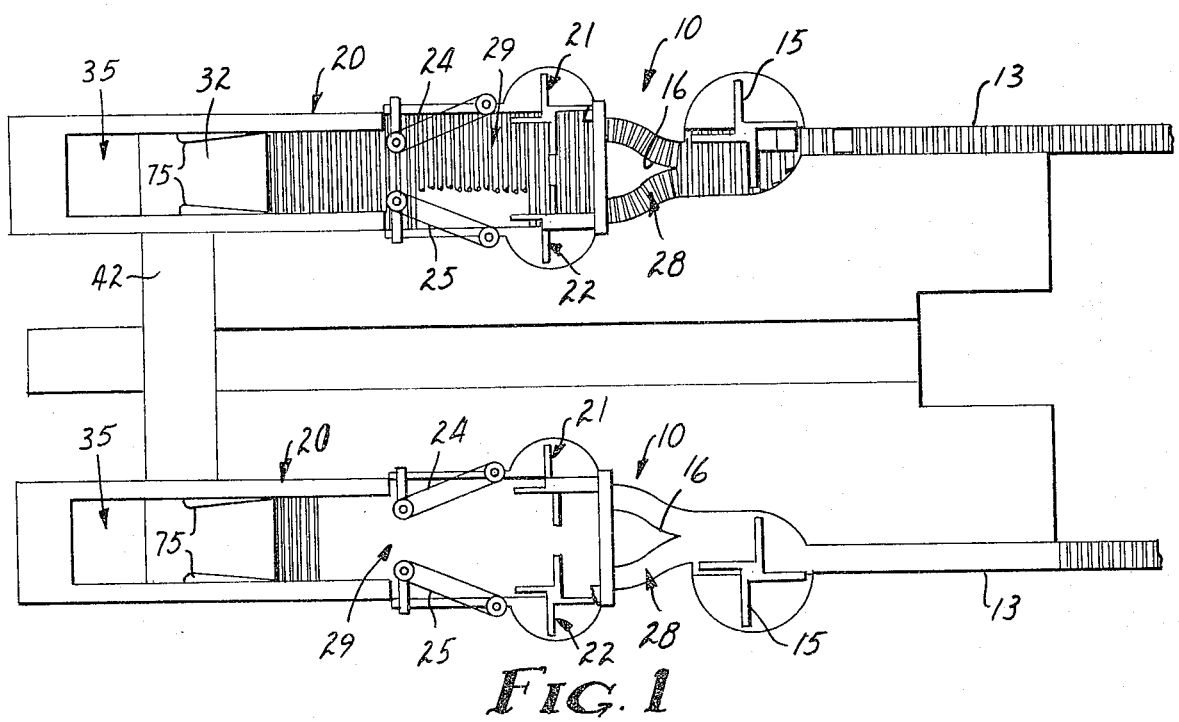
FIG. 1 is a schematic plan view of the palletizing area in a bottling, canning, or packaging plant disclosing the plan view of two pallet loading machines and pallet conveyor constructed in accordance with the present invention.

As illustrated in FIG. 1 two pallet loading machines generally designated 10 are positioned in a palletizing area in parallel position. The parallel positioning of the palletizing machines conveniently reduces the number of conveyors to one which are necessary to handle the empty pallets necessary for each machine. The pallet-loading machine 10 comprises an infeed conveyor 13 which feeds the cartons from a packaging machine onto the powered roller conveyors of the pallet-loading machine. Conveyor 13 may be a belt or powered roller conveyor. The cartons moving along the conveyor 13 are moved in a lengthwise direction in a single file against a primary star rotator 15 which catches two cartons at a time and rotates the two cartons 90°, separating the cartons and discharging the cartons onto two roller conveyors 28, each comprising a plurality of rollers with a true taper to separate the two cartons to follow separate paths about an island 16. The conveyors 28 move the cartons to the tier-forming section, generally designated 20, of the pallet loading machine 10. In the tier-forming section the cartons are continuously driven along the machine by powered rollers and the separated cartons are first driven toward a set of transversely spaced secondary rotators 21 and 22. The secondary rotators are programmed such that they can turn one or two cartons at a time and they are also powered to be rapidly raised vertically out of the path of the cartons if such is necessary to properly position the cartons to form the required pattern of cartons in a given tier. As the cartons pass the rotators 21 and 22 they engage a pair of converging squeeze conveyors 24 or 25 which move the cartons toward the center of a roller conveyor 29 in the tier-forming section of the machines 10.

The cartons are always driven by the conventional powered roller conveyors supported on the bed of the machine. The cartons are moved into engagement with a number of air operated stops 26 (see FIG. 4) which are powered to be raised betweeen certain rollers of the powered roller conveyor 29 stopping the cartons to allow successive cartons or rows of cartons to be positioned thereagainst forming the tiers. As each row is formed it is then advanced along the machine by dropping one stop to be caught by a succeeding stop until the next row is formed by a sufficient number of cartons passing through the secondary star wheels and feeding into the tier from both sides of each row. A final stop 26 (FIG. 4) indicates the tier is formed.

Figure 9:
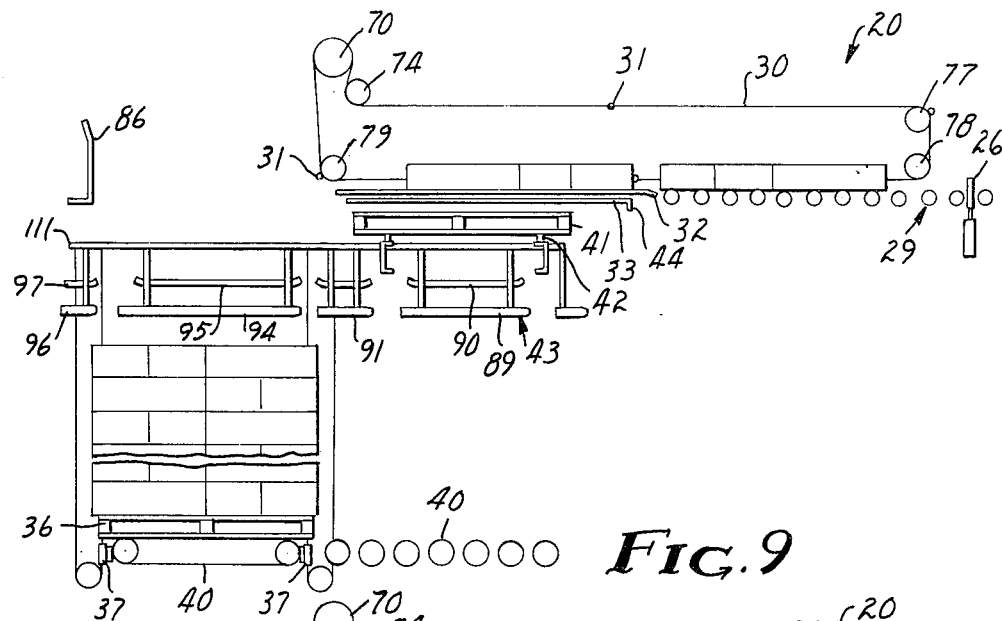

Once the tier is formed it is moved between sets of transversely spaced sprocket wheels for a pair of endless chains 30 between which extend flight or push bars 31, four bars are shown, in the illustrated machine, which bars successively push the completed tier from the powered roller conveyor 29 onto a fixed transfer plate 32 (see FIG. 9) having a continuous smooth upper surface. A push bar 31 continues to move the tier across the transfer plate 32 in the continued straight path of movement of the cartons. As the cartons move off they are placed on a movable stripping plate 33 having a continuous smooth upper surface which plate 33 moves at a linear rate slightly exceeding the rate of the push bar to receive a completed tier and place the completed tier in the upper part of a stacking chamber generally designated 35.

Figure 7:
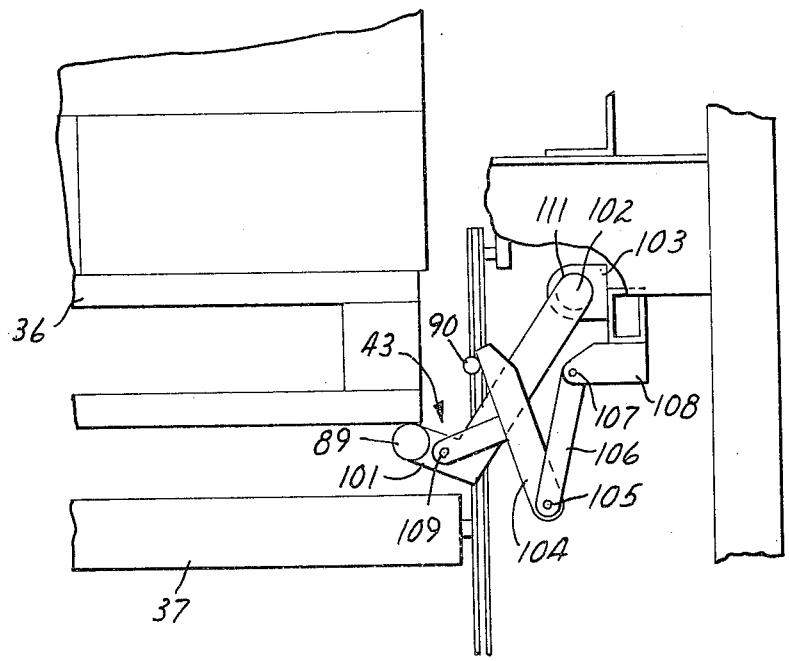
FIG. 7 is a fragmentary cross-sectional view similar to that of FIG. 6 showing the guide members in an alternate position.
Figure 6:
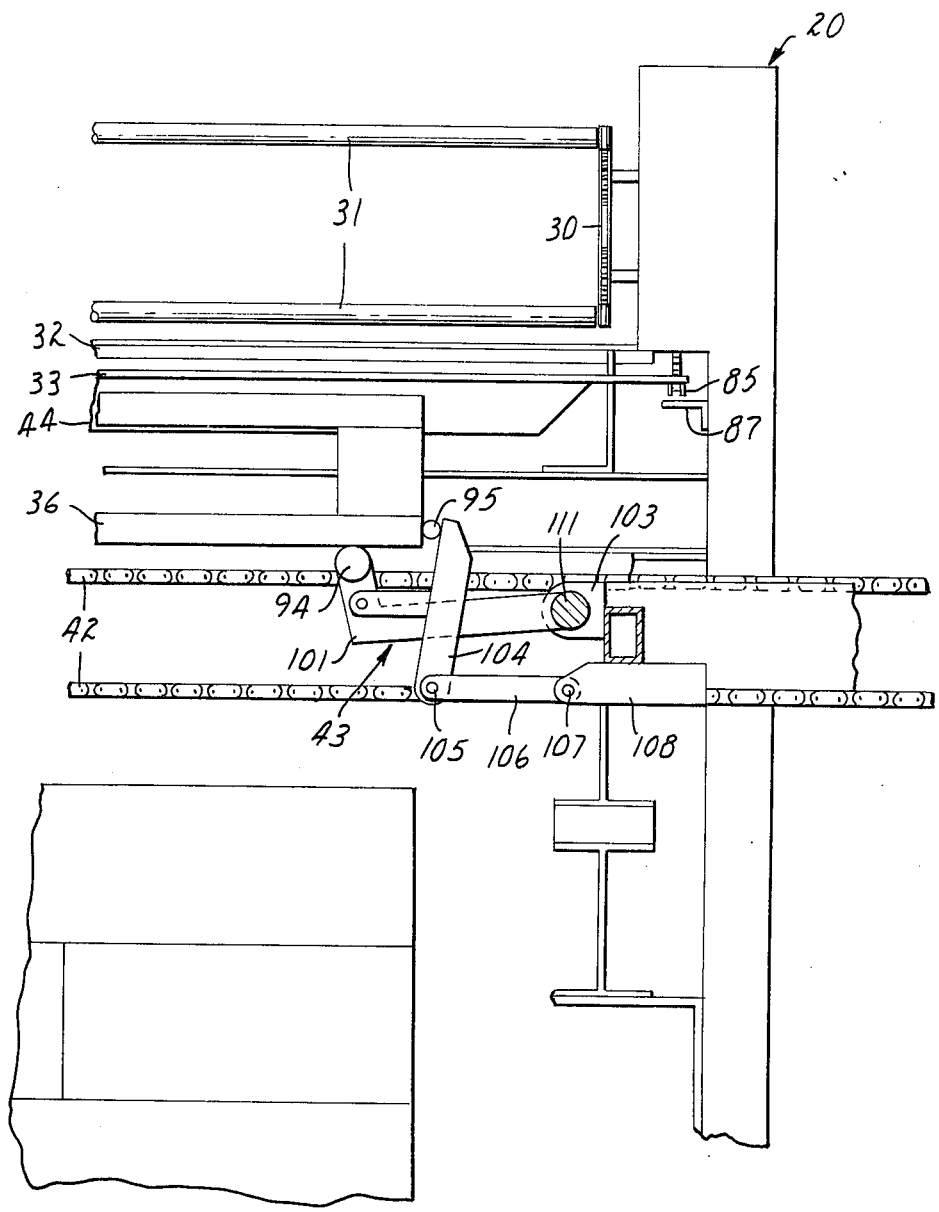
FIG. 6 is a fragmentary cross-sectional view taken along the lines 6—6 of FIG. 5.
Figure 8:
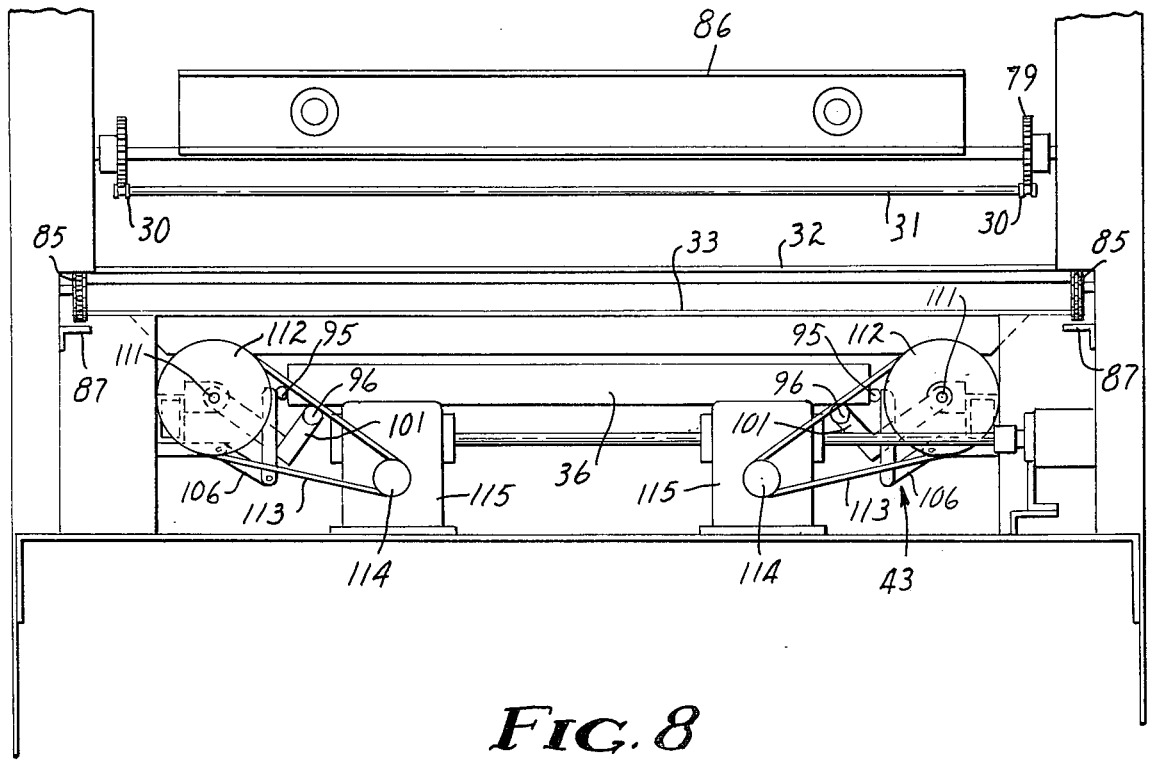
FIG. 8 is a cross-sectional view of the support and drive means for the guide members.
Figure 12:
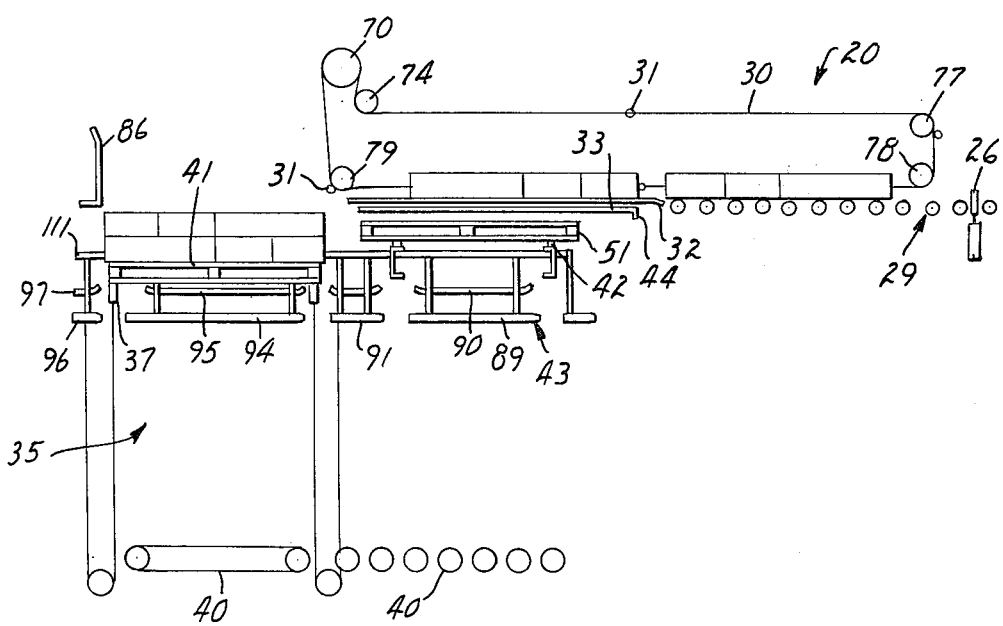
FIGS. 9, 10, 11 and 12 are schematic diagrams showing the operation of the loading station.
Figure 10:
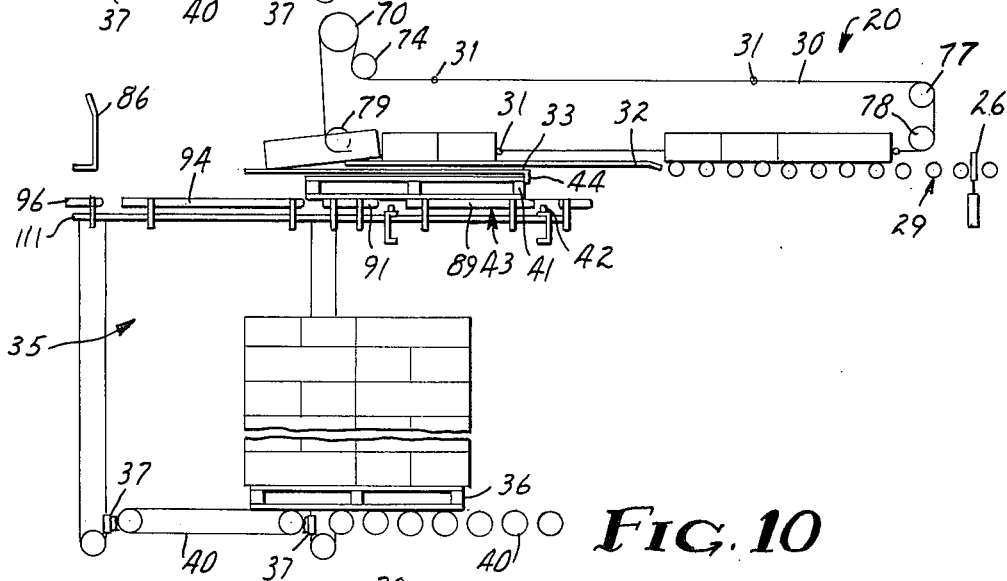
Figure 11:
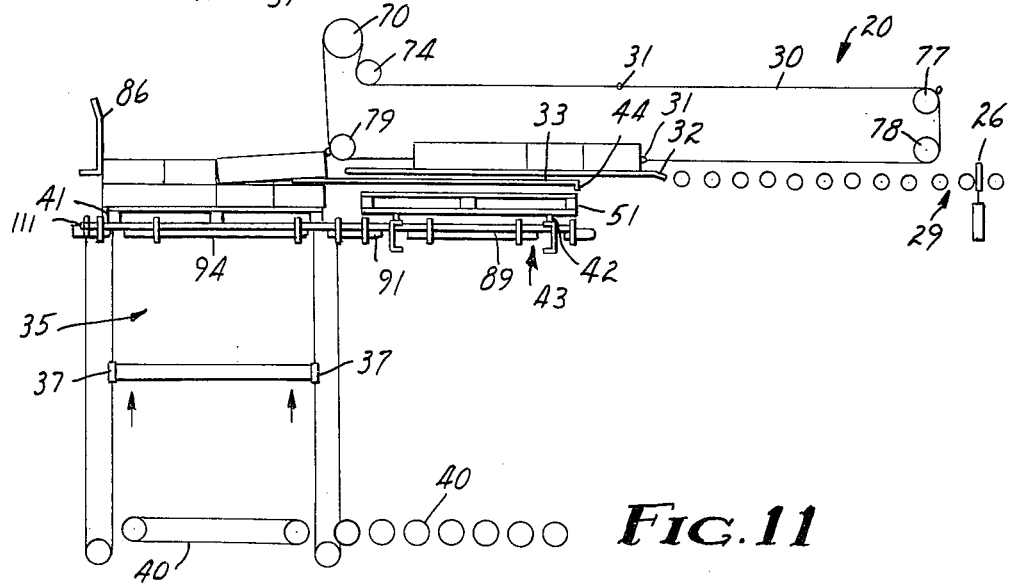

If a pallet 36 in the stacking chamber 35 is loaded, having received its top tier, the elevator 37 supporting the pallet 36 will be lowered in the stacking to a discharge position in the bottom of the stacking chamber. The pallet will be lowered onto a discharge conveyor 40 consisting of support rollers along the sides and a central drive chain to frictionally drive the pallet off the elevator. The elevator 37 is shaped to fit around the rollers and drive chain to thus set the pallet onto the discharge conveyor section within the stacking chamber. The pallet will then be moved by the discharge conveyor 40 out of the stacking chamber 35. At this time it will be necessary to move an empty pallet 41 into the top of the stacking chamber as the stripping plate 33 moves a new tier into position over the stacking chamber. As seen in FIG. 10, guide means are provided for lifting an empty pallet 41 off of a pallet inserting conveyor 42. The guide means comprise parallel axially and transversely aligned rails 43 mounted to swing to and out of the path of the pallet to be engaged by a depending rib 44 on the stripping plate 33. The rib 44 will engage one edge of the pallet 41 supported on the rails 43 and slide the pallet along the guide rails into a position above the stacking chamber 35. This is most clearly shown in FIG. 10 and as the stripping plate 33 moves from beneath the transfer plate 33 toward the stacking chamber the cartons are placed thereon under the pushing force of a bar 31. The stripping plate 33 is thus moving the empty pallet along the guide means and the cartons into the backing chamber. As the stripping plate returns to its position under to transfer plate 32 the cartons are stripped from the plate and drop onto the empty pallet 41 supported now on the rails 43 as shown in FIGS. 6, 7 and 11. When stripping plate 33 is returned under the fixed transfer plate 32, the guide means pivot about a fixed axis to lower the pallet 41 and the first tier of cartons. The stripping plate 33 then moves outward toward the stacking chamber to receive the second tier as it is forced off of the transfer plate 32. The stripping plate is then pulled from under the second tier as shown in FIG. 11. At this time the loaded pallet 36 has moved from the stacking chamber 35 under the transfer force of the discharge conveyor 40. The elevator 37 is rapidly raised to a position to support the new pallet 41 which is now loaded with two tiers of cartons. When the elevator 37 is raised to the position to support the second tier of cartons the stripping plate is returned to receive the third tier and the guide means supporting the pallet 41 are lowered to a position out of the way of the elevator 37 and of the conveyors. This is illustrated in FIG. 12. The conveyor 42 for inserting an empty pallet is positioned between the guide rails and when the guide means are lowered and additional pallet 51 may be moved into a position on the conveyor 42 beneath the stripping plate. It is retained on the conveyor 42 which is at a level to permit the free reciprocatory movement of the stripping plate 33 and the depending rib 44 as it moves back and forth to load the pallet 41 in the stacking chamber without interference. After the pallet is completely filled with cartons it will be lowered onto the discharge conveyor 40 and the next pallet 51 will be moved with the next tier of cartons over the stacking chamber 35 and be supported on the guide means. The guide means for the empty pallets will be described in greater detail hereinafter.

Figure 2:
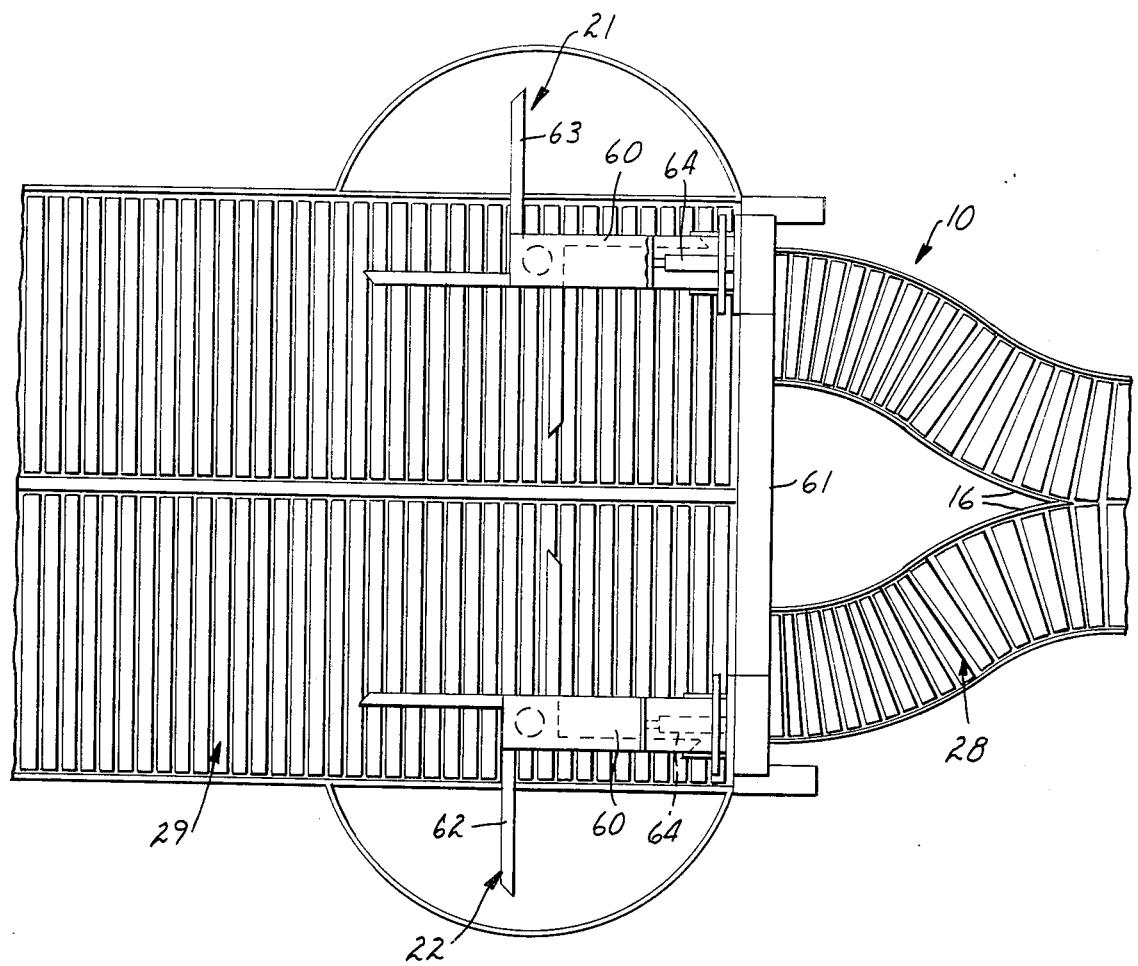
FIG. 2 is a fragmentary plan view of the tier-forming section.
Figure 3:
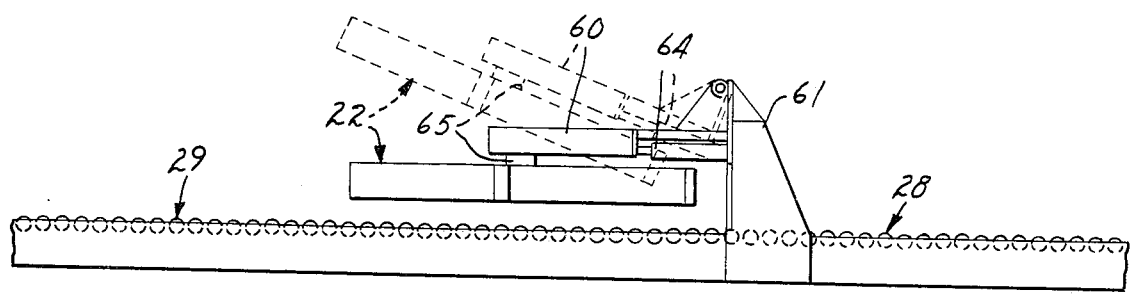
FIG. 3 is an elevational view of the tier-forming section shown in FIG. 2.

Turning now to a more detailed description of the machine it will be seen in FIG. 2 that the secondary rotators 21 and 22 are supported above the roller conveyor in the tier-forming section by a pair of frames 60 which are pivotally mounted to a bridge 61 which extends across the bed of the machine and the two separating roller conveyors 28 and across the paths of the cartons. The frames 60 position a pair of rotatable star wheels 62 and 63 respectively in the path of the cartons such that the cartons will move against the then positioned transversely extending arm of the star wheel. Motors 64 in the form of cylinders and reciprocating pistons are pivotally connected between the bridge 61 and the frames 60 to independently raise and lower the frames 60 and with them, the star wheel 62 and 63. These motors 64 permit the arms of the rotators to be rapidly raised a height sufficient to avoid contact with the cartons. Earlier known machines utilizing vertically movable rotators for tier forming have moved about a pivot axis positioned parallel to the direction of movement of the cartons. This movement requires movement of the rotator about an arc such that the rotator has to be raised a signification amount before the entire catch arm is raised above the path of the cartons. In the present embodiment, when any of the arm is out of the path the entire arm is clear.

Separate motors 65 are positioned one on each of the frames 60 to rotate the star wheels as desired. These motors 65 will rotate the star wheels 90° upon actuation. The rotators 21 and 22 are independently operated and they may rotate one or two cartons as the cartons move through the tier-forming station to produce the pattern desired for each tier. In most instances to form a seven-carton tier the rotators are operated independently and after a row of four cartons is formed one rotator will rotate a pair of cartons and the other will rotate one. Then they reverse to form the first row of a succeeding tier. They may then raise to allow cartons to pass without rotation to form the four carton rows etc. The desired patterns for the tiers are formed with successive patterns differing such that the cartons will be stacked like bricks in a stable stack on the pallet.

The squeeze conveyors 24 and 25 are positioned downstream from the secondary rotators 21 and 22 to gather the cartons and place them in side-to-side or end-to-end contact as determined by the pattern being formed.

FIGS. 4 and 5 illustrate the tier transfer and stacking section of the machine. After the tier has passed the final stop 26, the tier moves between the endless chains 30 to the edge of the stationary transfer plate 32 which transfers the tier to the stripping plate. The tiers are under the control of the drive chains 30 and flight bars 31 after they are formed. The chains 30 are driven from a set of sprockets 70 on a shaft 71. The shaft 71 is driven from a motor 73. The motor 73 drives the chains simultaneously, intermittently through predetermined cycles such that a bar 31 is positioned and held at the downstream side of the lower idler sprocket 74 of each chain for a time to allow the stripper plate 33 to return from the position over the stacking chamber 35 to its position beneath the transfer plate 32 with the bar 31 positioned to stop the return of the cartons. The chains 30 are then driven again when a tier is formed at the stop 26 to move a tier off the plate 32 and another tier onto plate 32 and allow the new tier to move between the chains 30. The chains 30 follow a generally rectangular path around the drive sprockets and then around four sets of idler sprockets 77, 78, 79 and 74.

The flight bar 31 to the rear of a tier positioned on the plate 32 will serve as a stop for the tier moved past the final stop 26 and along the rollers of the conveyor 29 toward the stationary plate 32. Positioned above the stationary plate 32 are guides 75 which aid in closing the cartons to maintain a tier formed of closely positioned cartons on the stationary plate.

The stripping plate 33 is reciprocated by means of a chain drive. A motor 80 drives a drive chain 81 to drive a pair of sprockets 82 on a shaft 83 around which sprockets 82 are chains 85. The chains 85 are secured to the stripping plate 33. Each transverse edge of the stripping plate is supported by guide members 87 which guide the stripper plate during its reciprocation from beneath the transfer plate 32 to its position over the stacking chamber 35. The motor 80 and chains 85 drive the stripper plate in a reciprocating pattern between its positions and so drives the stripper plate that its linear movement toward the position over the stacking chamber is faster than the movement of the chain driven bars 31 when it is being loaded. The movement in the load position is slightly in advance of the drive of the flight bars 31 such that the plate is moved from beneath the transfer plate 32 a slight amount before the cartons are placed thereon and the slight spacing of the cartons is corrected when the cartons are stopped by a bumper 86 placed in the path of the cartons and above the path of the stripper plate 33 in the stacking chamber 35.

As the pallet within the stacking chamber is filled and is moved to its lower position as explained hereinabove, the next cycle of the stacking sequence requires that an empty pallet be moved into the stacking chamber. This is accomplished by moving a pallet from beneath the stationary plate 32 to a position in the top of the stacking chamber. The pallet is placed beneath the plate 32 by the chain conveyor 42 which is operated during the stacking cycle. On transversely spaced opposite sides of the bed for the machine are supported guide means which will guide the pallet along a path from beneath the transfer plate 32 to a position in the uppermost area of the stacking chamber. This guide means comprises transversely and axially aligned rails 43 which may be swung from a position out of the path of the pallets to a position where they will lift the pallet from the conveyor 42 into a position to have the pallet engaged by the depending rib 44 on the stripping plate 33. An electric eye is positioned at a level an inch or so below the bottom of the stripping plate 33 to stop the vertical movement of the guide means. The guide rails 43 as shown most clearly in FIGS. 4, 6, and 7 comprise bars or tubes which are circular in cross section and which are formed at their ends with a tapered section such that the pallet is moved easily along a straight path from one rail to the next and will be guided onto the next rail along this tapered leading edge. The rails 43 comprise transversely spaced symmetrical first supporting rails 89 positioned between the flights of the chain conveyor 42 and above each support rail 89 is a guide rail 90. An additional pair of support rails 91 are positioned between the downstream chain of the conveyor 42 and the stacking area 35. A pair of transversely spaced symmetrical support rails 94 and guide rails 95 are positioned centrally within the stacking area. A pair of stub support rails 96 and guide rails 97 are positioned at the downstream side of the stacking chamber 35. As noted in FIGS. 6 and 7, the support rails 89 are fixed to the end of L-shaped arms 101 which are pivoted about an axis 102 in spaced brackets or ears 103. The guide rails 90 are supported at the end of T-shaped members 104 which have their opposite ends connected to a pivot axis 105 on an arm 106, which arm 106 is pivoted at an axis 107 to a support 108. The base of the T-shaped member 104 is connected by a pivot 109 to the arm 101. The pivot axis 102 is provided by a pair of shafts 111 which extend one along each opposite side of the bed of the machine. The shafts 111 are secured to the centers of rotatable wheels or drums 112 which are driven from chains 113 which in turn are driven from the output sprockets 114 of a pair of synchronized reducers 115. The reducers 115 are driven by a suitable motor such that they can drive the drums 112 to raise the guide rails 43 to lift the pallet off of the conveyor 42. After the pallet is in position as determined by an electric eye sensor in the path of the pallet the stripper plate 33 moves the pallet along the rails to its position in the stacking chamber. The pallet as it is moved into the stacking chamber by the stripping plate 33 is stopped by a bumper 117 supported by a pair of extendable air cylinders 118. The air cylinders position the pallet relative to the cartons which are positioned by the bumper 86. This positioning of the pallet as it is moved out is necessary since most pallet loads overhand the edges of the pallets slightly. Then the cartons are stripped onto the pallet and the reducers 115 rotate the two shafts 111 to lower the pallet from the position shown in FIG. 6 to the position shown in FIG. 7. As it is moved to the position shown in FIG. 7 the pallet may be lowered onto the elevator frame 37 which has returned or, if the discharge conveyor is a little slower the pallet may be lowered by the rails 94 within the stacking chamber 35 sufficiently to place a second tier of cartons upon the pallet. The pallet is supported on the support rails 94 of the guide rail means 43 and is positioned transversely within the stacking chamber 35 by the guide rails 95. When the pallet and the first tier is lowered to the position shown in FIG. 7, the support rails are moved toward the outer edges of the pallet as the arms 101 swing downward in an arc to lower the pallet. The support rails 94 can then be readily withdrawn from under the pallet placing the same on the elevator 37 when it is returned to its position in the top of the stacking chamber 35. The guide rails 43 will remain in a suspended position as the stacking of the pallet is continued and the elevator 37 progressively lowers the pallet sequentially by the height of a tier until such time as it is fully loaded and moves the pallet into contact with the discharge conveyor 40. The guide members will then be moved back to a position as shown in FIG. 6 to receive a pallet and raise it to a position to be engaged by the rib 44 of the stripper plate 33 and the cycle is repeated. At this time the pallet has moved the stack low enough such that there is no interference with the movement of the support rails 94 into the top of the stacking chamber.

The operation of the stacking portion of the machine and the sequencing of the various movement of the elements is illustrated in FIG. 13. As will be noted on the graph, the movement of the elevator follows the return of the stripping plate 33 beneath the transfer plate 32 and this requires approximately a half second of time. The stripper plate 33 will then move forward to position a tier over the stack in one second. This movement is at a rate of approximately 200 ft. per minute. The plate is again retracted under the transfer plate 32 at the same rate. Thus, the time for placing a tier on the stack requires approximately 2½ seconds. These three steps of operation are repeated for each tier which may range from seven through twelve tiers, depending on the height of the stack desired. After the last tier is formed the elevator 37 is lowered into the discharge conveyor 40 and the pallet is placed on the discharge conveyor in a lapse time of one second and another interval of one second is allowed then to raise the guide rails 43 into position to accept the new pallet. The pallet is moved forward with a tier of cartons in the next second of lapsed time and the plate is returned in another second. Thus three seconds of time were allowed to load the empty pallet into the stacking chamber and to place the first tier on the pallet. The guide rails 43 are then lowered to lower the first tier which requires a one-half second time interval and the second tier is moved out and placed thereon in the lapsed time of 2 seconds. During the interval of time that the empty pallet and the first tier of cartons are moved into the stacking chamber it will be noted that the elevator may have returned or will begin to raise from its bottom position in the stacking chamber up to a position to receive the pallet. It is thus in position to support the pallet on its two transversely spaced bars and on its two longitudinally positioned bars joined to the transverse bars. These bars forming the elevator fit about the conveyor 40 in the bottom of the stacking chamber.

The elevator 37 is lowered to a position placing the pallet on the discharge conveyor 40 after the elevator has been lowered stepwise to interrupt the signal between electric eyes positioned at the base of the stacking chamber. The interruption of these electric eyes indicate to the stepping mechanism of the machine that it will lower the elevator and will also operate the guide means to lift the empty pallet off of the elevator 42 and move it into the top of the stacking chamber.

The timing and control for palletizing machines are thus rather conventional electric eyes which indicate whether a carton is in the proper position when it is desired that there be a carton in that position and to sense when a row of cartons has moved past a certain position in the tier-forming area.

Having thus described the present invention with regards to a preferred embodiment it will be understood that certain changes may be made in the structure illustrated without departing from the spirit or scope of the present invention as defined in the appended claims.

What is claimed is:

1. A palletizing machine for forming a plurality of cartons in an array to form tiers for stacking on a pallet, said apparatus comprising:
   a machine bed,
   means on said bed for continuously catching and turning 90° an even number of cartons received in a single continuous file and placing said turned cartons in two rows,
   conveyor means on said bed for receiving said cartons in the two rows and moving them along opposite edges of said machine bed,
   stop means in the path of said conveyor means for stopping said cartons on said conveyor means and means for rotating said stop means about an axis perpendicular to said conveyor means for selectively rotating said cartons to orient the cartons in a transverse row on said bed from both sides of said bed, said stop means comprising a pair of star wheels each having radial arms for stopping and rotating as many as two cartons at a time on said conveyor means 90°,
   means for raising said stop means about an axis transverse to said conveyor means and comprising motor means and pivot support means for lifting said radial arms out of the path of said cartons on said conveyor means to allow cartons to pass without turning,
   means disposed adjacent opposite sides of said bed for forcing said cartons rotated by or passing said stop means on each edge toward each other to define at least one row of a said tier, and
   additional stop means along said machine bed for stopping successive rows of boxes until an array of several rows is formed to define a said tier.

2. A palletizing machine according to claim 1 wherein said pivot support means comprises a pair of frames extending from a support in the direction of movement of cartons on said conveyor means, said frames being connected at one end to said support for pivotal movement about an axis perpendicular to said direction, said frames each supporting a star wheel at its end opposite said one end for rotation about an axis perpendicular to said direction and the axis of said pivotal movement.

3. A palletizing machine according to claim 1 wherein:
   second conveyor means are disposed transverse to said bed for moving cartons from said stop means and first-mentioned conveyor means along the path to said additional stop means in the direction of movement of said first-mentioned conveyor means,
   a stationary plate on said bed extending between said edges and being positioned at the end of said second conveyor means for supporting a row of said cartons,
   chain means positioned along opposite transverse sides of said bed and along a portion of said second conveyor means and along said stationary plate, said chain means being connected by transversely extending flight bars positioned for receiving a tier of cartons and for moving a tier of cartons across said stationary plate, and
   stripper plate means reciprocating in a plane below and closely spaced to said stationary plate in the direction of movement of said cartons along said second conveyor means and of said flight bars for receiving a tier moved across said stationary plate by said flight bars and for returning under said stationary plate to place a said tier on a pallet.

4. A palletizing machine according to claim 3 wherein: said bed is supported on a frame in an elevated position above a floor level,
   hoist means for supporting a pallet are disposed at one end of said bed adjacent an end of said stationary plate and below said stripping plate when in a tier supporting position, said hoist means being movable stepwise for receiving successive tiers for forming a stack, and
   third conveyor means at the bottom of said hoist means for moving a stack from said hoist means.

5. A palletizing machine according to claim 4 comprising
   means for inserting empty pallets into the upper portion of said hoist means for positioning a pallet to receive at least one tier of cartons while said third conveyor means is moving a stack from said hoist means.

6. A palletizing machine according to claim 5 wherein
   said hoist means comprises a frame, chain means movable vertically in said frame, an elevator comprising transversely extending bars and perpendicularly spaced bars connected to said chain means for movement therewith from the upper portion of said hoist means to a position in relationship to said third conveyor means to permit a pallet on said elevator to be moved therefrom by said third conveyor means, and said means for inserting empty pallets comprises a fourth conveyor means for inserting empty pallets seriatim beneath said stationary plate and said stripping plate when said stripping plate is in position below said stationary plate, and movable guide and support bars for raising a pallet off said fourth conveyor means to a path to contact a portion of said stripping plate and forming a path for a said pallet from beneath said stationary plate to a position in said upper portion of said hoist means.

7. A palletizing machine comprising accumulator means for accumulating cartons and forming a tier of said cartons, a stationary smooth plate positioned adjacent said accumulator means, a movable bar extending transversely of said accumulator means for pushing a said tier of cartons across said stationary plate, endless chain means supporting said movable bar at each end to carry said bar across at least a portion of said accumulator means and across said stationary plate for moving a sais tier of cartons onto said stationary plate and off said stationary plate and for stopping said bar adjacent the edge of said stationary plate to hole a tier of cartons, reciprocating plate means movable in a plane generally parallel to and closely spaced below said stationary plate from a position beneath said stationary plate in a direction away from said accumulator means for receiving a tier of cartons as it is moved off said statonary plate by said bar, elevator means adjacent said stationary plate for supporting a pallet to be loaded with successive tiers of cartons, whereby said cartons will move from said reciprocating means onto a pallet on said elevator means upon return of said reciprocating plate means to said position beneath said stationary plate, additional bar means on said endless chain means for moving a second said tier onto said stationary plate, and means for inserting empty pallets into the upper portion of said elevator means simultaneously with the movement of said reciprocating plate means from said position beneath said stationary plate for positioning a pallet to receive at least one tier of cartons while said elevator means is lowered to a position to permit discharge of a loaded pallet, said means for inserting empty pallets comprising conveyor means for inserting empty pallets seriatim beneath said stationary plate and the plane of said reciprocating plate means, and movable guide and support bar means supported along the path of said reciprocating plate means for raising a pallet off said conveyor means to a position to be engaged by said reciprocating plate means for movement therewith to a position above said elevator means and for supporting a said pallet upon return of said reciprocating plate means and the tier of cartons deposited thereon.

8. A palletizing machine according to claim 7 wherein said elevator means comprises a vertically standing frame, chain means movable vertically in said standing frame, a support connected to said chain means for movement therewith between the upper portion of said standing frame and the bottom portion and comprising spaced transversely extending bars and spaced perpendicular bars joined to said traverse bars.

9. A palletizing machine according to claim 7 wherein said movable guide and support bar means comprises support bars secured to a plurality of links supported for movement about axes extending along the transversely opposite sides of said machine, and wherein said reciprocating plate means comprises a plate having a smooth upper surface and a rib depending from said plate for engaging an edge of said pallet to slide the same along said support bars from a position beneath said stationary plate means to a position beyond said stationary plate and above said elevator means.

10. A palletizing machine comprising accululator means for accumulating cartons and forming a tier of said cartons;

a stationary plate positioned adjacent said accumulator means;

movable bar means for pushing a said tier of cartons across said stationary plate;

means supporting said movable bar means to carry said movable bar means across at least a portion of said accumulator means and across said stationary plate for moving a said tier of cartons across said stationary plate;

reciprocating plate means movable in a plane generally parallel to and closely spaced below said stationary plate from a position beneath said stationary plate in a direction away from said accumulator means for receiving a tier of cartons as it is moved across said stationary plate;

elevator means adjacent said stationary plate for supporting a pallet to be loaded with successive tiers of cartons;

whereby said cartons will move from said reciprocating plate means onto a pallet on said elevator means upon return of said reciprocating plate means to said position beneath said stationary plate; and means for inserting empty pallets into the upper portion of said elevator means for positioning a pallet to receive at least one tier of cartons while said elevator means is lowered to a position to permit discharge of a loaded pallet, said means for inserting empty pallets comprising conveyor means for inserting empty pallets seriatim beneath said stationary plate and the plane of said reciprocating plate means, and movable guide and support bar means supported along the path of said reciprocating plate means for raising a pallet off said conveyor means to a position to be engaged by said reciprocating plate means for movement therewith to a position above said elevator means and for supporting a said pallet upon return of said reciprocating plate means and the tier of cartons deposited thereon.

11. A palletizing machine according to claim 10 wherein said movable guide and support means comprises support bars secured to a plurality of links supported for movement about axes extending along the transversely opposite sides of said machine, and wherein said reciprocating plate means comprises a plate having a smooth upper surface and rib means depending from said plate for engaging an edge of said pallet to slide the same along said support bars from a position beneath said stationary plate means to a position beyond said stationary plate and above said elevator means.

12. A palletizing machine according to claim 11 wherein said movable guide and support means includes means for moving said support bars about said axes to lower said support bars from said position to receive at least one tier of cartons to a position to receive a second tier of cartons on a said pallet.

13. A palletizing machine for forming a plurality of cartons in an array to form tiers for stacking on a pallet, said apparatus comprising:

a machine bed supported on a frame in an elevated position above the floor level, means on said bed for continuously catching and turning 90° an even number of cartons received in a single continuous file and placing said turned cartons in two rows, conveyor means on said bed for receiving said cartons in the rows and moving them along opposite edges of said machine bed, accumulator means for accumulating said cartons on said conveyor means and for forming said cartons into tiers, a stationary plate on said bed extending between said edges and being positioned at the end of said accumulator means for supporting a tier of said cartons, chain means positioned along opposite transverse sides of said bed and along a portion of said second conveyor means and along said stationary plate, said chain means being connected by transversely extending flight bars positioned for receiving a tier of cartons and for moving a tier of cartons from said accumulator means across said stationary plate, stripper plate means reciprocating in a plane below and closely spaced to said stationary plate in the direction of movement of said cartons by said flight bars for receiving a tier moved across stationary plate by said flight bars and for returning under said stationary plate to place a said tier on a pallet, hoist means for supporting a pallet, said hoist means being disposed at one end of said bed adjacent an end of said stationary plate and betlow said stripping plate when in a tier supporting position, and being movable stepwise for receiving successive tiers for forming a stack, said hoist means comprises a second frame, chain means movable vertically in said second frame, an elevator comprising transversely extending bars and perpendicularly spaced bars connected to said chain means for movement therewith from the upper portion of said hoist means to a lowered position, discharge conveyor means disposed at the bottom of said hoist means for moving a stack from said hoist means when said elevator is in said lowered position, and means for inserting empty pallets into the upper portion of said hoist means for positioning a pallet to receive at least one tier of cartons while said discharge conveyor means is moving a stack from said hoist means, said means for inserting empty pallets comprising additional conveyor means for inserting empty pallets seriatim beneath said stationary plate and said stripping plate when said stripping plate is in position below said stationary plate, and movable guide and support bars for raising a pallet off said additional conveyor means to a path to contact a portion of said stripping plate and forming a path for a said pallet from beneath said stationary plate to a position in said upper portion of said hoist means.

* * * * *

UNITED STATES PATENT AND TRADEMARK OFFICE
CERTIFICATE OF CORRECTION

PATENT NO. : 3,954,190
DATED : May 4, 1976
INVENTOR(S) : Richard W. Howard; Roman J. Weier; and Ronald E. Wyman It is certified that error appears in the above—identified patent and that said Letters Patent are hereby corrected as shown below:

In the Abstract, lines 19 and 20 delete "capable of substantially increasing the rate at which cartons".

Col. 5, line 47, "and" to -- an --.

Col. 7, line 30, change "the" (second occurrence) to -- a --.

Signed and Sealed this

Seventh Day of September 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,954,190
DATED : May 4, 1976
INVENTOR(S) : Richard W. Howard; Roman J. Weier; and Ronald E. Wyman It is certified that error appears in the above-identified patent and that said Letters Patent are hereby corrected as shown below:

Col. 10, line 8, change "boxes" to -- cartons --.

Signed and Sealed this

Twenty-first Day of December 1976

[SEAL]

Attest:

RUTH C. MASON
*Attesting Officer*

C. MARSHALL DANN
*Commissioner of Patents and Trademarks*